(12) United States Patent
Mizuno et al.

(10) Patent No.: US 7,888,853 B2
(45) Date of Patent: Feb. 15, 2011

(54) LIGHT-EMITTING DEVICE EXHIBITING ELECTROCHEMICAL LUMINESCENCE

(75) Inventors: Yukitami Mizuno, Tokyo (JP); Rei Hasegawa, Yokohama (JP); Shintaro Enomoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 12/199,213

(22) Filed: Aug. 27, 2008

(65) Prior Publication Data

US 2009/0058291 A1 Mar. 5, 2009

(30) Foreign Application Priority Data

Aug. 29, 2007 (JP) .............................. 2007-222691

(51) Int. Cl.
*F21K 2/08* (2006.01)
*G02F 1/00* (2006.01)

(52) U.S. Cl. ....................... 313/358; 313/483; 359/321; 359/265; 359/245

(58) Field of Classification Search ................. 313/358, 313/483; 359/296, 245, 265–275, 315, 321
See application file for complete search history.

(56) References Cited

U.S. PATENT DOCUMENTS 7,002,723 B2 * 2/2006 Enomoto et al. ............ 359/273

2007/0109218 A1 * 5/2007 Saito et al. ..................... 345/55
2009/0243502 A1 * 10/2009 Kizaki et al. ................ 315/246

FOREIGN PATENT DOCUMENTS

JP 2007-012566 1/2007

* cited by examiner

*Primary Examiner*—Sikha Roy
*Assistant Examiner*—Jose M Diaz
(74) *Attorney, Agent, or Firm*—Turocy & Watson, LLP

(57) ABSTRACT

A light-emitting device is provided, which includes a first substrate, a first pair of electrodes formed above the first substrate, a second substrate disposed apart from the first substrate, a second pair of electrodes formed above the second substrate, a selective permeable layer disposed between the first substrate and the second substrate, a first light-emitting layer disposed between the first substrate and the selective permeable layer, a second light-emitting layer disposed between the second substrate and selective permeable layer. The first light-emitting layer contains a first light-emitting material which emits light through an electrochemical oxidation or reduction thereof and a supporting salt. The second light-emitting layer contains a second light-emitting material which emits light through an electrochemical oxidation or reduction thereof and a supporting salt. The selective permeable layer is non-permeable or hardly permeable to the first and second light-emitting materials but permeable to the supporting salt.

20 Claims, 2 Drawing Sheets

LIGHT-EMITTING DEVICE EXHIBITING ELECTROCHEMICAL LUMINESCENCE

CROSS-REFERENCE TO RELATED APPLICATIONS

This application is based upon and claims the benefit of priority from prior Japanese Patent. Application No. 2007-222691, filed Aug. 29, 200 , the entire contents of which are incorporated herein by reference.

BACKGROUND OF THE INVENTION

1. Field of the Invention

This invention relates to a light-emitting device wherein an electrochemically luminescent material exhibiting electrochemical luminescence (ECL) is employed.

2. Description of the Related Art

The display to be employed in a mobile telephone or a notebook personal computer is required to be thinner and lighter. A display device fundamentally constituted by a luminescent display such as a liquid crystal display and an organic electroluminescent (EL) display is popularly utilized in various fields.

The phenomenon of electrochemical luminescence (ECL) is now attracting much attention as a different light-emitting phenomenon. In this phenomenon, the electrochemical oxidation-reduction of a light-emitting material is produced as a voltage is applied between the electrodes to generate ion radicals, which are then brought into an excited state through the impingement among them, this excited state being subsequently deactivated to cause the emission of light. Since the light-emitting material is dissolved in liquid, even if the light-emitting material deteriorates, it is enabled to diffuse in the liquid so that the light-emitting material can be prevented from being localized. Therefore, it may be possible to avoid producing the prominent difference in deterioration of display performance between neighboring pixels that may become a serious problem in the case of an organic EL display. Further, the electrode material to be employed in this case is not limited to any special materials but may be selected from various materials which are relatively stable.

In JP-A 2007-12566 (KOKAI), there is proposed a light-emitting device which emits a pseudo-white light exhibiting a high illumination intensity. In this light-emitting device, a couple of emission cells, each constituted by a light-emitting layer containing a specific kind of fused-salt electrolyte and a luminescent pigment and by a porous layer, are laminated one another, thereby making it possible to obtain the pseudo-white light. Further, it has been generally tried to realize a white emission display through a combination of a blue emission and a yellow emission.

However, in the case of the light-emitting layer of ECL, the light-emitting material deteriorates because of the application of a voltage thereto. Especially, in the case of the supporting salt incorporated in the light-emitting layer, when the concentration thereof is decreased, it would become impossible to maintain the same degree of luminance unless a higher voltage is applied thereto.

BRIEF SUMMARY OF THE INVENTION

A light-emitting device according to one aspect of the present invention comprises:
a first substrate;
a first pair of electrodes formed above the first substrate;
a second substrate disposed to face the first substrate and spaced apart from the first substrate;
a second pair of electrodes formed above the second substrate;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

A light-emitting device according to another aspect of the present invention comprises:
a first substrate composed of a glass substrate;
a first pair of electrodes formed above the first substrate and composed of a transparent conductive film;
a second substrate disposed to face the first substrate and spaced apart from the first substrate;
a second pair of electrodes formed above the second substrate;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

A light-emitting device according to a further aspect of the present invention comprises:
a first substrate;
a first pair of electrodes formed above the first substrate;
a second substrate composed of a glass substrate and disposed to face the first substrate and spaced apart from the first substrate;
a second pair of electrodes formed on the second substrate and composed of a transparent conductive film;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

DETAILED DESCRIPTION OF THE INVENTION

Next, embodiments will be explained with reference to drawings.

As a result of the intensive studies made by the present inventors on a light-emitting device which is capable of obtaining a desired emission of light through the impression of AC voltage on a light-emitting layer containing a light-emitting material and a supporting salt, the following findings are obtained. More specifically, in the case of a light-emitting device wherein a first light-emitting layer for emitting blue emission and a second light-emitting layer for emitting yellow emission are laminated one another so as to obtain white emission through the mixing of the blue light with the yellow light, even if it is possible to obtain white light at the initial stage, the white light becomes yellowish with time because of the production of color drift.

Namely, even if the same voltage is applied to these light-emitting layers, the deterioration of emission efficiency is produced at a faster rate in the first light-emitting layer for emitting blue emission than in the second light-emitting layer for emitting yellow emission. One of the reasons for this phenomenon may be conceivably attributed to the fact that the supporting salt decompose because of the electrochemical oxidation-reduction thereof, resulting in the decrease in concentration of the supporting salt in the first light-emitting layer.

The deterioration of the supporting salt in the first light-emitting layer can be prevented by individually controlling the voltage to be applied for obtaining blue emission from the first light-emitting layer and the voltage to be applied for obtaining yellow emission from the second light-emitting layer. In this case however, it is required to separately prepare a controlling circuit for each of these light-emitting layers, unavoidably becoming obstacles in an attempt to reduce the manufacturing cost or to miniaturize the device.

The present inventors have succeeded in preventing the color drift of the initial white by minimizing the difference in concentration of the supporting salt between the first light-emitting layer for emitting blue emission and the second light-emitting layer for emitting yellow emission.

Figure 1:
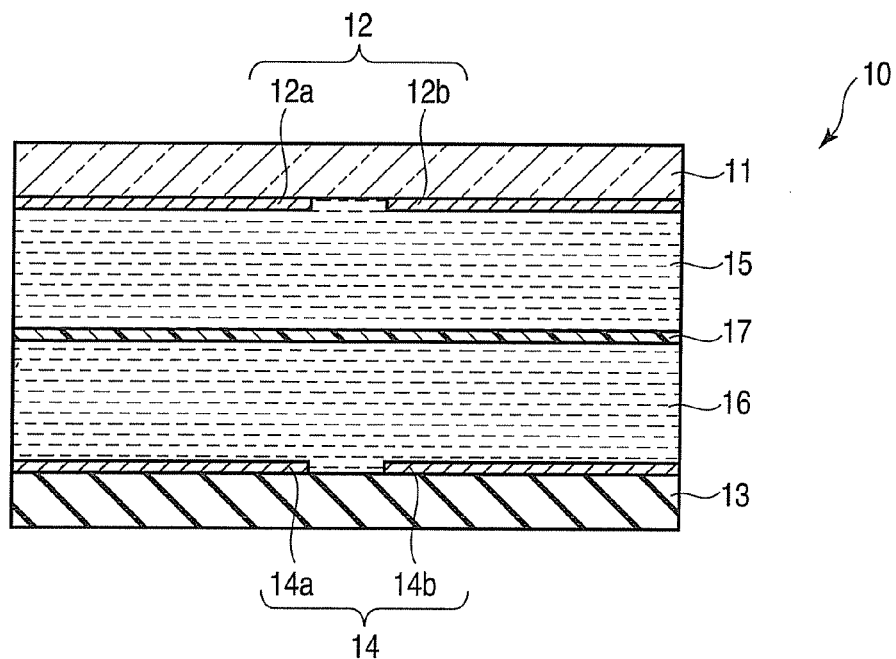
FIG. 1 is a cross-sectional view of the light-emitting device according to one embodiment.

As shown in FIG. 1, in the case of the light-emitting element 10 according to this embodiment, a first substrate 11 and a second substrate 13 are disposed to face each other and spaced away from each other. The first substrate 11 is provided thereon with a first pair of electrodes 12a and 12b and the second substrate 13 is provided thereon with a second pair of electrodes 14a and 14b.

The first substrate 11 may be constituted, for example, by glass or plastic materials. As the plastic materials, the examples thereof include PET (polyethylene terephthalate), PEN (polyethylene naphthalate), PES (polyether sulfone), PC (polycarbonate), etc. If this first substrate 11 is to be disposed as an observation face, this first substrate 11 should preferably be selected from materials which are minimal in absorption of the light of visible light zone.

If this first substrate 11 is to be disposed as an observation face, the pair of electrodes 12a and 12b formed on the first substrate 11 are constituted by a transparent conductive film. Examples of the transparent conductive film include metal oxide semiconductors such as oxides of transition metals including, for example, oxides of titanium, zirconium, hafnium, strontium, zinc, tin, indium, yttrium, lanthanum, vanadium, niobium, tantalum, chromium, molybdenum and tungsten; perovskite such as $SrTiO_3$, $CaTiO_3$, $BaTiO_3$, $MgTiO_3$, $SrNb_2O_5$, etc.; composite oxides or mixed oxides of these materials; GaN; etc.

If the second substrate 13 is to be disposed as an observation face, the pair of first electrodes to be formed on the first substrate 11 may be constituted by a reflective electrode made of Al, Ag, etc.

In order to increase the aperture ratio, the area of the first pair of electrodes 12a and 12b should preferably be as large as possible. Further, since it is required to perform the same reaction on the electrodes and to prevent the reaction from becoming fluctuated depending on the kinds of electrode material, the electrodes 12a and 12b should preferably be both formed of the same material and of the same size.

The second substrate 13 which is disposed to face the first substrate 11 and spaced away from the first substrate 11 may be of the same material as that employed in the first substrate 11. If the observation face is to be constituted by the second substrate 13, the second substrate 13 should preferably be selected from materials which are minimal in absorption of the light of visible light zone.

The second pair of electrodes 14a and 14b to be formed on the second substrate 13 may be constituted by the same material as that of the first pair of electrodes. In order to increase the aperture ratio, the area of the second pair of electrodes 14a and 14b should preferably be as large as possible.

Between the first substrate 11 and the second substrate 13, there is disposed a light-emitting layer which is formed of a liquid layer comprising a light-emitting (ECL) material which emits the light of predetermined color through electrochemical oxidation or reduction, and a supporting salt which is required for executing the electrochemical reaction, these light-emitting material and supporting salt being dissolved in a solvent. This light-emitting layer is constituted by a first light-emitting layer 15 containing a first light-emitting material and disposed close to the first substrate 11 and by a second light-emitting layer 16 containing a second light-emitting material and disposed close to the second substrate 13. Between the first light-emitting layer 15 and the second light-emitting layer 16, there is interposed a selective permeable layer 17.

The first light-emitting material to be contained in the first light-emitting layer 15 is an ECL material which emits blue light. Examples of this first light-emitting material include polycyclic aromatic compounds such as anthracene derivatives (9,10-diphenyl anthracene), pentacene derivatives (6,10-diphenyl pentacene), perifurantene derivatives (dibenzotetra(methylphenyl) perifurantene), etc.; π-electron conjugated polymers such as polythiophene derivatives, polyparaphenylene derivatives, polyfluorene derivatives, etc.; heteroaromatic compounds such as coumalin, etc.; organometallic compounds such as tris(2-phenyl pyridine)iridium, etc.; and chelate lanthanoid complexes; etc.

The second light-emitting material to be contained in the second light-emitting layer 16 is an ECL material which emits yellow light. Examples of this second light-emitting material include polycyclic aromatic compounds such as naphthacene derivatives (rubrene, 5,12-diphenyl naphthacene), etc.; π-electron conjugated polymers such as polyparaphenylene vinylene derivatives, etc.; chelate metal complexes such as Ru(bpy)$_{32}$, etc.; and organometallic compounds such as tris(2-phenyl pyridine)iridium, etc.

Since it is needed to reliably separate these light-emitting materials by an ultrafilter membrane, the weight average molecular weight of these first and second light-emitting materials should preferably be 1000 or more.

In order to facilitate the oxidation-reduction of the ECL material, a supporting salt is contained together with the ECL material in the first light-emitting layer 15 and the second light-emitting layer 16. In order to facilitate the dissociation of the supporting salt into ions, a solvent (as a liquid electrolyte) should preferably be contained in both of these light-emitting layers.

With respect to the supporting salt, examples thereof include tetrabutyl ammonium perchlorate, potassium hexafluorophosphate, lithium trifluoromethane sulfonate, lithium perchlorate, tetra-n-butyl ammonium tetrafluoroborate, tripropyl amine, tetra-n-butyl ammonium fluoroborate, tetrabutyl ammonium hexafluorophosphate, etc.

With respect to the solvent, examples thereof include acetonitrile, N,N-dimethyl formamide, propylene carbonate, o-dichlorobenzene, glycerin, water, ethyl alcohol, propyl alcohol, dimethyl carbonate, ethylene carbonate, y-butyrolactone, NMP, 2-methyl tetrahydrofuran, toluene, tetrahydrofuran, benzonitrile, cyclohexane, normal hexane, acetone, nitrobenzene, 1,3-dioxolane, furan, benzofluoride, etc.

The first light-emitting layer 15 formed of a liquid layer is required to contain any one of aforementioned supporting salts and any one of aforementioned ECL materials, which are dissolved in any one of aforementioned solvents, and also required to be interposed between the first substrate 11 having the first pair of electrodes 12a and 12b formed thereon and the selective permeable layer 17. Further, the second light-emitting layer 16 formed of a liquid layer is required to contain any one of aforementioned supporting salts and any one of aforementioned ECL materials, which are dissolved in any one of aforementioned solvents, and also required to be interposed between the second substrate 13 having the second pair of electrodes 14a and 14b formed thereon and the selective permeable layer 17.

Since the first light-emitting layer 15 and the second light-emitting layer 16 are both constituted by a liquid layer, it is possible to bring them into a state where side reaction products to be produced during the reaction processes for the emission of light including the electrochemical reaction can be hardly localized. Because of this, the light-emitting device can be preferably prevented from deteriorating in performance.

As described above, the selective permeable layer 17 is interposed between the first light-emitting layer 15 and the second light-emitting layer 16. Although this selective permeable layer 17 is non-permeable or hardly permeable to the molecules of light-emitting materials and to the oxidized species (cation radicals) or reduced species (anion radicals) of the light-emitting materials but this selective permeable layer 17 is permeable to the supporting salt. The term "non-permeable" herein means that it is impossible for the light-emitting materials to permeate the layer, and the term "hardly permeable" herein means that even though it may be possible for the light-emitting materials to permeate the layer but the amount of the light-emitting materials that can be permeated therethrough would be so small that may be disregarded.

As the isolating layer constituting the selective permeable layer 17, it is possible to employ any kind of known ultrafilter membrane such for example as cellulose, polycarbonate, polyamide, tetrafluoroethylene, etc. The cellulose may be selected from cellulose nitrate, acetyl cellulose and regenerated cellulose. With respect to the molecular cutoff of the ultrafilter membrane, it should preferably be 200 or more. As long as the ultrafilter membrane is selected to have such a molecular cutoff, it would be quite suitable for use in preventing the permeation of the light-emitting material and in permitting the permeation only of the supporting salt. Because of excellent resistance to an organic solvent dissolving the light-emitting material, the employment of cellulose is more preferable.

The light-emitting device according to this embodiment can be actuated by the following method for instance.

Figure 2:
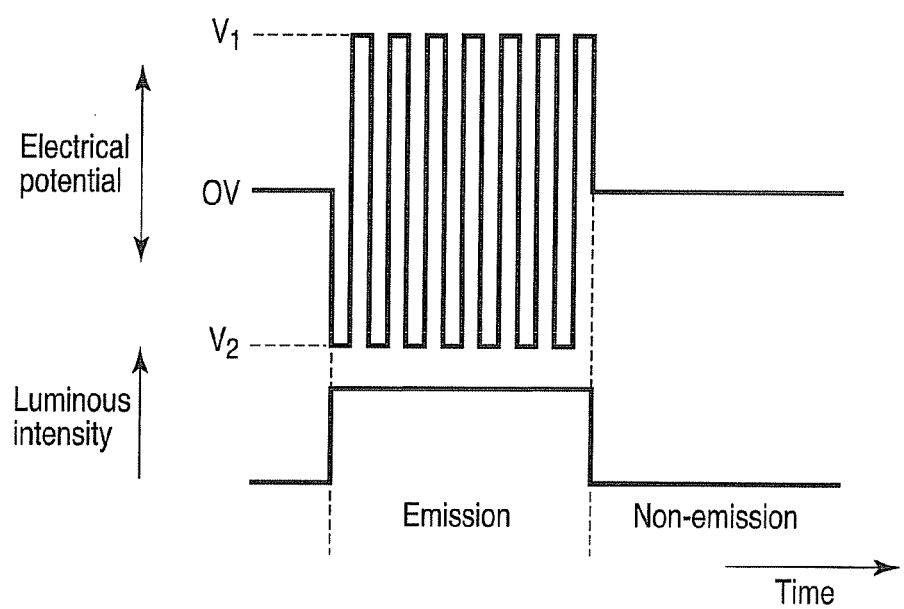
FIG. 2 is a diagram for illustrating the method of actuating the light-emitting device according to one embodiment.

First of all, an AC voltage is applied between the first pair of electrodes 12a and 12b. FIG. 2 illustrates, as one example, the potential difference between the first pair of electrodes 12a and 12b in relation to the states of emission/non-emission of the first light-emitting layer 15.

As shown in FIG. 2, a voltage is applied to one electrode 12a in such a manner that the electrical potential of the electrode 12a becomes, by turns, $V_1$ ($V_1$ is a negative value of reduction potential where the ECL material becomes anion radical) and $V_2$ ($V_2$ is a positive value of reduction potential where the ECL material becomes cation radical). A voltage of reverse polarity in opposite to that applied to the electrode 12a is applied to the other electrode 12b. As a result, the anion radical of the ECL material and the cation radical of the ECL material are enabled to be generated alternately in this pair of electrodes 12a and 12b. Because of the impingement of these radicals, the ECL material is brought into an excited state and then the emission of light take place in the process of deactivation of the excited state. Unless the voltage is applied in this manner, the ECL material will be kept in a non-emission state. As the frequency of the AC voltage, it may be several tens of Hz for instance.

In this manner, the emission of blue light can be obtained in the first light-emitting layer 15. In the second light-emitting layer 16 also, it is possible to obtain yellow light emission by applying an AC voltage to the second pair of electrodes 14a and 14b in the same manner as explained above. When an AC voltage is applied simultaneously to both of the first pair of electrodes 12a and 12b and the second pair of electrodes 14a and 14b, the emission of yellow light and the emission of blue light are simultaneously caused, thus making it possible to obtain the emission of white light.

According to the light-emitting device of this embodiment, it is possible to alleviate the color drift that may be produced with time in this emission of white light. This can be realized through the effects of the selective permeable layer 17 interposed between the first light-emitting layer 15 and the second light-emitting layer 16 as explained below. Namely, since the selective permeable layer 17 is disposed as an isolating layer, the supporting salt which is needed for the electrochemical reaction is enabled to interchangeably move between these two light-emitting layers.

Moreover, this selective permeable layer 17 have such characteristics that the ECL molecules or the anion radicals or cation radicals of the ECL molecules cannot pass or can scarcely pass through the selective permeable layer 17. Because of this, it is possible to prevent the ECL molecules or the anion radicals or cation radicals of the ECL molecules from moving from the first light-emitting layer 15 into the second light-emitting layer 16 or vice versa and hence to prevent the intermingling of these light-emitting materials.

Even if the intensity of emission is decreased because of the decomposition of the supporting salt in one of the light-emitting layers, the supporting salt can be supplied from the other light-emitting layer into said one of the light-emitting layers since the supporting salt is enabled to pass through this selective permeable layer 17. As a result, it is possible to avoid any possibility that a difference in concentration of the supporting salt is substantially produced between the first light-emitting layer 15 and the second light-emitting layer 16, thus preventing any possibility that one of the ECL layers singly decreases in intensity of emission. Therefore, it is now possible to alleviate the color drift of white emission constituted by blue emission and yellow emission.

Next, one example of the present invention will be explained below.

EXAMPLE 1

By following the procedures explained below, a light-emitting device constructed as shown in FIG. 1 was manufactured. In this case, the light-emitting device was manufactured to have a size of 2.5 inches×2.5 inches with the area of the light-emitting portion thereof being set to a 4 mm×4 mm square.

A 1.1-mm-thick glass substrate was prepared as a first substrate 11 and an ITO film having a thickness of 1000 Å was formed on the first substrate 11. Then, the ITO film was subjected to a patterning treatment to form a first pair of electrodes 12a and 12b.

A glass substrate having the same features as described above was prepared as a second substrate 13 and an ITO film having a thickness of 1000 Å was formed on the second substrate 13. Then, the ITO film was subjected to a patterning treatment to form a second pair of electrodes 14a and 14b.

As the selective permeable layer 17, a cellulose-based ultrafilter membrane having a molecular cutoff of 200 was employed.

A spacer having a height of 2 μm was formed on the first substrate 11 and the first substrate 11 was disposed to face the selective permeable layer 17 so as to secure a 2-μm gap between the first pair of electrodes 12a and 12b and the selective permeable layer 17. A spacer having a height of 2 μm was formed also on the second substrate 13 and the second substrate 13 was disposed to face the selective permeable layer 17 so as to secure a 2-μm gap between the second pair of electrodes 14a and 14b and the selective permeable layer 17. All of these circumferential gap portions of these substrates excluding a pouring port was sealed by epoxy resin to create a first light-emitting layer cell and a second light-emitting layer cell.

10 mM of tetrabutyl ammonium hexafluorophosphate was prepared as a supporting salt and dissolved in o-dichlorobenzene solvent to obtain a mixture. 4 wt % of poly[9,9-bis(3,6-dioxaheptyl)-fluoren-2,7-diyl] was added as a first light-emitting material to the mixture to obtain a raw material for the first light-emitting layer.

A raw material for the second light-emitting layer was obtained by repeating the same procedures as described above except that 4 wt % of poly[2,5-bis(3',7'-dimethyloctyloxy)-1,4-phenylene vinylene] was employed as a second light-emitting material.

The raw material for the first light-emitting layer was poured into the aforementioned first light-emitting layer cell to create a first light-emitting layer 15 and the raw material for the second light-emitting layer was poured into the aforementioned second light-emitting layer cell to create a second light-emitting layer 16.

An AC voltage was applied between the first pair of electrodes 12a and 12b, finding that the first light-emitting layer cell was enabled to emit blue light and an AC voltage was applied between the second pair of electrodes 14a and 14b, finding that the second light-emitting layer cell was enabled to emit yellow light. By applying an AC voltage to the first pair of electrodes 12a and 12b and also to the second pair of electrodes 14a and 14b, it was possible to confirm the mixing of the blue light with the yellow light to obtain the emission of white light.

An AC voltage of 2.5V rectangular wave was applied between the first pair of electrodes 12a and 12b, and an AC voltage of 2V rectangular wave was applied between the second pair of electrodes 14a and 14b. As a result, the emission of blue light and the emission of yellow light were concurrently observed, thus observing the emission of white light. As a result of spectral measurement, the emission of white light was found as being constituted by a combination of the emission of blue light component and the emission of yellow light component.

About two minutes after the initiation of passing an electric current, the luminance of emission was halved. However, as a result of the measurement of spectrum, the configuration of spectrum was not changed and the emission of white light was retained.

COMPARATIVE EXAMPLE

Figure 3:
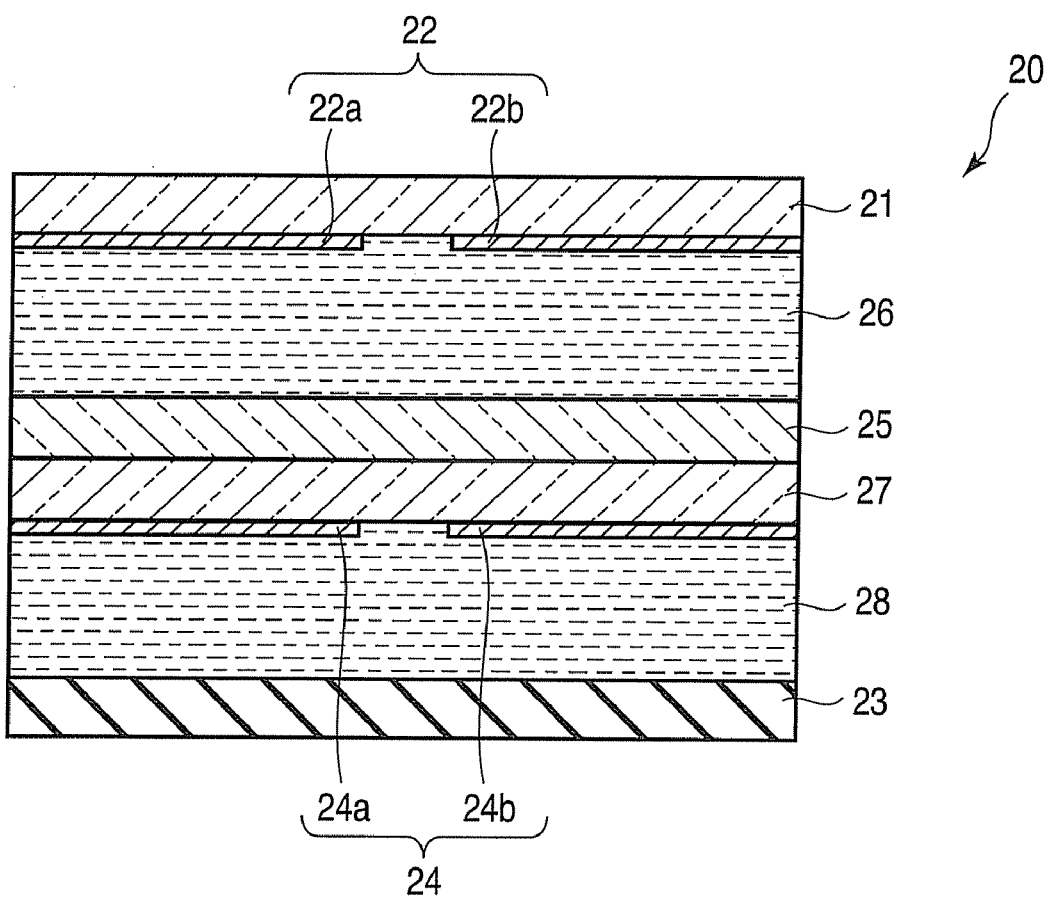
FIG. 3 is a cross-sectional view of the light-emitting device of one comparative example.

A light-emitting device constructed as shown in FIG. 3 was manufactured as a comparative example. In the case of the light-emitting device 20 shown in FIG. 3, a first light-emitting layer 26 was interposed between a first substrate 21 having a first pair of electrodes 22a and 22b formed thereon and a third substrate 25. Further, a second light-emitting layer 28 was interposed between a second substrate 27 having a second pair of electrodes 24a and 24b formed thereon and a fourth substrate 23. The third substrate 25 was laminated on the second substrate 27.

As the first substrate 21 and the second substrate 27, the same kind of glass substrate as described in above Example 1 was employed. With respect to the first and second pairs of electrodes to be formed on these substrates, they were formed also through the patterning of an ITO film in the same manner as described in Example 1.

A glass substrate having a thickness of 1.1 mm was prepared as the third substrate 25. The first substrate 21 was disposed to face the third substrate 25 with a spacer column having a height of 2 μm being interposed therebetween, thereby creating a first light-emitting layer cell. A material for the first light-emitting layer having the same composition as that employed in Example 1 was poured into the first light-emitting layer cell to obtain the first light-emitting layer 26.

A glass substrate having a thickness of 1.1 mm was prepared as the fourth substrate 23. The second substrate 27 was disposed to face the fourth substrate 23 with a spacer column having a height of 2 μm being interposed therebetween, thereby creating a second light-emitting layer cell. A material for the second light-emitting layer having the same composition as that employed in Example 1 was poured into the second light-emitting layer cell to obtain the second light-emitting layer 28.

The third substrate 25 was laminated on and adhered to the second substrate 27, thereby manufacturing the light-emitting device as shown in FIG. 3.

An AC voltage of 2.5V rectangular wave was applied between the first pair of electrodes 22a and 22b, and an AC voltage of 2V rectangular wave was applied between the second pair of electrodes 24a and 24b. As a result, the emission of blue light and the emission of yellow light were concurrently observed, thus observing the emission of white light.

As a result of spectral measurement, the emission of white light was found as being constituted by a combination of the emission of blue light component and the emission of yellow light component. However, two minutes after the initiation of passing an electric current, the luminance of emission was halved. Moreover, as a result of the measurement of spectrum, the blue light component was dissipated from the spectrum and only the yellow light component was left in the spectrum, thus making the color of emission yellowish.

It was assumed that by optimizing the materials in terms of high-efficiency and long life and by optimizing the applying voltage and the driving frequency, it would be possible to retain white emission even if the emission time is prolonged.

According to the embodiment of the present invention, it is possible to provide a light-emitting device which is capable of suppressing the deterioration of the light-emitting layer containing ECL materials and which can be dispensed with the provision of any control circuit for preventing the color drift from white emission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light-emitting device comprising:
a first substrate;
a first pair of electrodes formed above the first substrate;
a second substrate disposed to face the first substrate and spaced apart from the first substrate;
a second pair of electrodes formed above the second substrate;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

2. The device according to claim 1, wherein the selective permeable layer is formed of an ultrafilter membrane having a molecular cutoff of 200 or more.

3. The device according to claim 2, wherein the ultrafilter membrane is formed of a material selected from the group consisting of cellulose, polycarbonate, polyamide and tetrafluoroethylene.

4. The device according to claim 3, wherein the ultrafilter membrane is formed of cellulose.

5. The device according to claim 4, wherein the cellulose is selected from the group consisting of cellulose nitrate, acetyl cellulose and regenerated cellulose.

6. The device according to claim 1, wherein the first light-emitting material emits blue light and the second light-emitting material emits yellow light.

7. The device according to claim 6, wherein the first light-emitting material is formed of a material having a weight average molecular weight of 1000 or more.

8. The device according to claim 7, wherein the first light-emitting material is selected from the group consisting of polycyclic aromatic compounds, $\pi$-electron conjugated polymers, heteroaromatic compounds, organometallic compounds and chelate lanthanoid complexes.

9. The device according to claim 6, wherein the second light-emitting material is formed of a material having a weight average molecular weight of 1000 or more.

10. The device according to claim 9, wherein the second light-emitting material is selected from the group consisting of polycyclic aromatic compounds, $\pi$-electron conjugated polymers, chelate metal complexes and organometallic compounds.

11. The device according to claim 1, wherein the supporting salt contained in the first light-emitting layer and in the second light-emitting layer is selected from the group consisting of tetrabutyl ammonium perchlorate, potassium hexafluorophosphate, lithium trifluoromethane sulfonate, lithium perchlorate, tetra-n-butyl ammonium tetrafluoroborate, tripropyl amine, tetra-n-butyl ammonium fluoroborate and tetrabutyl ammonium hexafluorophosphate.

12. The device according to claim 1, wherein the first light-emitting layer and the second light-emitting layer further comprise a solvent.

13. A light-emitting device comprising:
a first substrate composed of a glass substrate;
a first pair of electrodes formed above the first substrate and composed of a transparent conductive film;
a second substrate disposed to face the first substrate and spaced apart from the first substrate;
a second pair of electrodes formed above the second substrate;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

14. The device according to claim 13, wherein the second pair of electrode is formed of Al or Ag.

15. The device according to claim 13, wherein the selective permeable layer is formed of an ultrafilter membrane having a molecular cutoff of 200 or more.

16. The device according to claim 13, wherein the ultrafilter membrane is formed of a material selected from the group consisting of cellulose, polycarbonate, polyamide and tetrafluoroethylene.

17. A light-emitting device comprising:
a first substrate;
a first pair of electrodes formed above the first substrate;
a second substrate composed of a glass substrate and disposed to face the first substrate and spaced apart from the first substrate;
a second pair of electrodes formed on the second substrate and composed of a transparent conductive film;
a first light-emitting layer disposed between the first substrate and the second substrate and close to the first substrate, the first light-emitting layer comprising a first light-emitting material which emits light through an electrochemical oxidation or reduction thereof and a supporting salt;
a second light-emitting layer disposed between the first substrate and the second substrate and close to the first substrate, the second light-emitting layer comprising a second light-emitting material which emits light through an electrochemical oxidation or reduction thereof and a supporting salt; and
a selective permeable layer interposed between the first light-emitting layer and the second light-emitting layer, the selective permeable layer being non-permeable or hardly permeable to the first and second light-emitting materials but permeable to the supporting salt.

18. The device according to claim 17, wherein the first pair of electrode is formed of Al or Ag.

19. The device according to claim 17, wherein the selective permeable layer is formed of an ultrafilter membrane having a molecular cutoff of 200 or more.

20. The device according to claim 17, wherein the ultrafilter membrane is formed of a material selected from the group consisting of cellulose, polycarbonate, polyamide and tetrafluoroethylene.

* * * * *